United States Patent Office 3,224,435
Patented Dec. 21, 1965

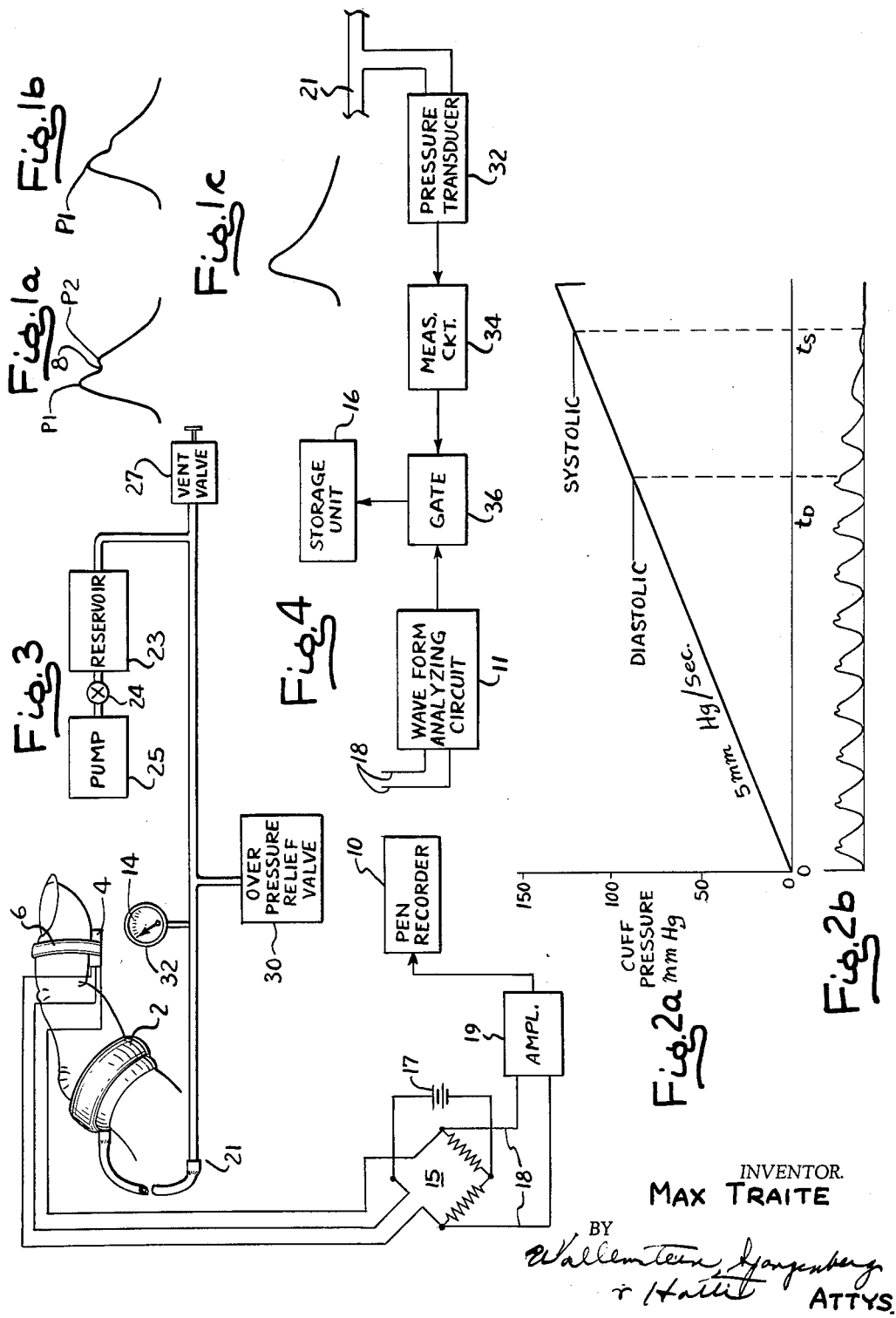

3,224,435
METHOD OF MEASURING BLOOD PRESSURE
Max Traite, Old Bridge, N.J., assignor to Gulton Industries, Inc., Metuchen, N.J., a corporation of New Jersey
Filed Sept. 10, 1962, Ser. No. 222,489
1 Claim. (Cl. 128—2.05)

This invention relates to a method of measuring diastolic blood pressure.

Numerous schemes have heretofore been proposed for measuring diastolic and systolic blood pressure. The most common method of measuring blood pressure is the one used by examining doctors which utilizes an inflatable cuff surrounding the patient's upper arm and a mercury pressure gauge which indicates the cuff pressure. The cuff is initially inflated to a maximum pressure above the systolic pressure and the pressure in the cuff is then gradually allowed to fall to zero. As the pressure drops, the doctor listens with a stethoscope to the sound of the blood rushing through the vessels of the arm beyond the cuff, and from characteristics of these sounds is able to make a rough estimate of the systolic pressure and the diastolic pressure by noting the level of the mercury in the mercury pressure gauge at which certain distinctive sounds are heard. This audible method of measuring blood pressure is not very accurate, particularly with respect to the diastolic pressure measurement, and is not readily adaptable for incorporation in automatic measuring and recording apparatus. Other techniques for measuring diastolic pressure have been proposed but they have been unsatisfactory for a number of reasons, one of the most important of which being that the acceptability of the results depended on the particular heart beat characteristic of the patient tested.

It is, accordingly, an object of the present invention to provide a unique method for measuring diastolic blood pressure which gives relatively accurate and reliable results with practically all patients. Another object of the invention is to provide a method as just described and which is particularly suited for incorporation in automatic measuring and recording equipment if desired.

The above and other objects, advantages and features of the invention will become apparent upon making reference to the specification to follow, the claim and the drawings wherein:

FIGS. 1a, 1b and 1c are plethysmograms of a digit of the limb of a patient during a single heart beat, when the blood vessels of the digit or limb are subjected to an external cuff pressure below the diastolic level, at the diastolic level and above the diastolic level, respectively;

FIGS. 2a and 2b are waveforms respectively illustrating on the same time scale the external cuff pressure variable and the plethysmogram of the blood vessel covering a number of heart beats to indicate the manner in which the method of the invention is carried out;

FIG. 3 is a block diagram of exemplary equipment for practicing the method of the present invention by visual observation of the plethysmogram waveforms; and FIG. 4 is a block diagram of an exemplary system applying the present invention to an automatic measuring and recording system.

The method of the present invention utilizes the technique of applying a varying external vessel occluding pressure as with an inflatable cuff 2 (FIG. 3) to the limb of the patient. The cuff pressure gradually starts from a lower limit substantially below the lowest expected diastolic pressure and increases progressively and slowly relative to the heart beat rate so that the lowest expected diastolic pressure is reached only after a number of heart beats much greater than two. The cuff pressure is increased to an upper limit above the highest expected diastolic pressure to be measured. A highly sensitive plethysmogram sensing unit 4 having good low and high frequency response characteristics may be used to determine the instantaneous change of volume of the limb beyond the point at which the cuff pressure is applied. When a relatively large number of heart beats occur before the cuff pressure reaches the diastolic pressure limit, an observer (or sensing equipment involved) can readily detect or sense the change of the plethysmogram from a normal steady state condition. In the case where the cuff is applied to the base of the finger, the sensor most advantageously comprises a piezo-resistive element 4, such as a bi-element of silicon or germanium crystals secured as by a strap 6 to the fleshy bottom portion of the finger, where volume changes with blood pressure are most pronounced. The bi-element comprises two piezo-resistance elements whose resistances vary in opposite directions for a given applied force.

When the cuff pressure is below the diastolic pressure, the plethysmogram (i.e. the variation in the volume of the blood vessels of the limb affected by the cuff) during a single heart beat will, in practically all persons, be similar to that shown in FIG. 1a. This plethysmogram waveform comprises an initial main hump or pulse P1 which terminates in a valley or notch 8 defining the beginning of a second pulse or hump P2 to be referred to as a notch pulse.

One of the most important aspects of the present invention is the discovery that when the slowly varying cuff pressure reaches the diastolic blood pressure, the notch pulse P2 flattens out. (Before this point, the cuff has little or no compressive effect on the blood vessel thereof or the plethysmogram.) This is illustrated in FIG. 1b. When the cuff pressure is above the diastolic pressure, the flattened portion of the waveform disappears altogether as shown in FIG. 1c. When the cuff pressure reaches a point in excess of the systolic pressure, the waveform of FIG. 1c disappears altogether. Between the condition of FIG. 1c, where there is no notch pulse, and of FIG. 1a, where there is a fully developed notch puse which maintains a constant shape for all pressures below the diastolic level, it can be said that the shape of the notch pulse is in a state of change or development. The determination of the diastolic pressure by the flattening out or changing of the shape of the notch pulse P2 has been found to be a relatively accurate indicator of diastolic pressure in practically all patients tested with the present invention. This is an exceedingly important factor because of the reasons why many of the prior techniques for measuring diastolic blood pressure have proven unsatisfactory is that they did not produce valid results with a significant number of the patients tested.

The specific aspect of the invention utilizes a progressively increasing pressure because in the plethysmogram of the limb involved there may then be readily examined visually by watching the trace of the plethysmogram over a large number of heart beats on a recording instrument 10 coupled to the element 4, or automatically by an automatically operable waveform analyzing circuit generally indicated by reference numeral 11 (FIG. 4). In the exemplary cuff pressure waveform of FIG. 2a, the cuff pressure builds up from zero pressure at the rate of 5 mm. of mercury per second. At this rate, it is possible that the cuff pressure will reach the diastolic pressure between heart beats, resulting in a small error since the flattening of the notch pulse may not be observed in such case until the occurrence of the next heart beat. For a heart beat of 60 beats per minute the possible error is only about 2½ mm. of mercury, a very satisfactory degree of error for most medical purposes. When the flattening out of the notch pulse is detected (see notch pulse P2 of FIG. 2b), the cuff pressure indicated on a pressure gauge 14 is noted by the operator or automatically recorded in a record or storage unit 16 (FIG. 4) by signals fed from the waveform analyzing circuit 11. When the cuff pressure is about one heart beat away from the diastolic pressure, the flattened portion of the plethysmogram disappears as illustrated in FIG. 2b. When the cuff pressure finally reaches the systolic level, as is well known, the plethysmogram waveform disappears altogether.

The apparatus for varying the cuff pressure and sensing the flattening of the notch pulse P2 may of course, take a variety of forms. For example, in its most simple form, where a piezo-resistive element 4 is used to sense the change in volume of the patient's finger 3, the element 4 may be connected to form two arms of a Wheatstone or similar type of bridge circuit 15. The input of the bridge circuit is coupled to a suitable source of energizing voltage 17 and the output thereof may be coupled by a pair of conductors 18 to an amplifier 19. The output of the amplifier is connected to a pen recorder or oscillograph 19 where a purely visual means for detecting the flattening of the notch pulse is utilized, or to the aforesaid waveform analyzing circuit 11.

In FIG. 3 a supply conduit 21 extends to the cuff 2 to inflate the same. The conduit 21 in turn is fed by a suitable source of progressively increasing pressure which, for example, may include a reservoir 23 fed by a pump 25 which feeds air under pressure thereto through a needle valve 24. The pump 25 feeds air into the reservoir 23, which gradually builds up the pressure therein, and the output of the reservoir is connected to the conduit 21. A manually operable vent valve 27 may be provided momentarily to vent the reservoir 23 and the conduit 21 to atmospheric pressure at the beginning of each measuring cycle. The vent valve may be manually operable where a strictly visual means for sensing the diastolic and systolic pressure levels or automatically by the waveform analyzing circuit 11. To avoid excessive pressure in the conduit 21 which could possibly hurt the patient, a pressure relief valve 30 is preferably utilized which automatically vents the conduit 21 to atmosphere when the pressure therein exceeds a given value in excess of the highest systolic pressure to be measured.

Where the invention is applied to automatic measuring and recording equipment, a pressure transducer 32 (FIG. 4) may be coupled to the conduit 21 and the output of the transducer connected to a suitable measuring circuit 34 which produces a digital or analog output indicating pressure. The output of the measuring circuit 34 may be coupled through an electronic gate 36 to the recorder or storage unit 16. The gate 36 prevents the output of the measuring circuit 34 from reaching the storage unit 16 until the instants the gate opening control signals are fed to the gate 36 from the waveform analyzing circuit 11 indicating the flattening out of the notch pulse (FIG. 16) P2 and the disappearance of the plethysmogram waveform.

It should be understood that numerous modifications may be made of the exemplary forms of the invention described above without deviating from the broader aspects of the present invention.

What I claim as new and desire to protect by Letters Patent of the United States is:

A method of measuring diastolic blood pressure comprising: applying an inflatable cuff around an external blood vessel of the limb of the person being tested, obtaining a plethysmogram waveform of the limb beyond the blood vessel, the waveform, in the absence of a cuff pressure reaching the diastolic blood pressure, comprising an initial or main hump or pulse followed by a smaller hump or pulse of lesser amplitude than said main hump or pulse, gradually increasing the pressure in said cuff between a lower limit substantially below the lowest expected diastolic blood pressure to be measured and at least an upper limit at or above the upper expected diastolic blood pressure to be mesured, and at a relatively slow rate where a number of heart beats much greater than two will occur before the cuff pressure reaches said lower limit, wherein the change between a steady state and a changed condition of the plethysmogram can be readily detected, and recording or detecting the cuff pressure at the point in time where the shape of the lesser pulse first flattens out.

References Cited by the Examiner
UNITED STATES PATENTS

| | | | |
|---|---|---|---|
| 2,710,001 | 6/1955 | Freyburger | 128—2.05 |
| 2,815,748 | 12/1957 | Boucke | 128—2.05 |
| 2,826,191 | 3/1958 | Burns | 128—2.05 |
| 2,865,365 | 12/1958 | Newland | 128—2.05 |
| 3,104,661 | 9/1963 | Halpern | 128—2.05 |

RICHARD A. GAUDET, *Primary Examiner.*

JORDAN FRANKLIN, *Examiner.*